United States Patent
Baumann

(10) Patent No.: US 6,884,348 B2
(45) Date of Patent: Apr. 26, 2005

(54) MODULE OF UNITS FOR AN INTERNAL COMBUSTION ENGINE

(75) Inventor: Dieter Baumann, Greven (DE)

(73) Assignee: Hengst GmbH & Co. KG, Muenster (DE)

(*) Notice: Subject to any disclaimer, the term of this patent is extended or adjusted under 35 U.S.C. 154(b) by 166 days.

(21) Appl. No.: 10/415,231

(22) PCT Filed: Oct. 23, 2001

(86) PCT No.: PCT/EP01/12199

§ 371 (c)(1),
(2), (4) Date: Apr. 25, 2003

(87) PCT Pub. No.: WO02/34359

PCT Pub. Date: May 2, 2002

(65) Prior Publication Data

US 2004/0099239 A1 May 27, 2004

(30) Foreign Application Priority Data

Oct. 25, 2000 (DE) .......................... 200 18 278

(51) Int. Cl.[7] .................. B01D 36/00; B01D 36/02; B04B 5/10
(52) U.S. Cl. .................. 210/232; 210/251; 210/295; 494/49
(58) Field of Search .................. 210/232, 295, 210/251; 494/49

(56) References Cited

U.S. PATENT DOCUMENTS

| 4,640,772 A | 2/1987 | Graham |
| 5,603,829 A | 2/1997 | Baumann |
| 5,693,217 A | * 12/1997 | Erdmannsdoerfer et al. .. 210/97 |
| 5,975,245 A | 11/1999 | Jephott et al. |
| 6,368,513 B1 | * 4/2002 | Christophe et al. ......... 210/781 |
| 6,442,529 B1 | 8/2002 | Krishan et al. |

FOREIGN PATENT DOCUMENTS

| DE | 44 20 868 | 12/1995 |
| DE | 196 50 033 | 6/1998 |
| EP | 0 816 645 | 1/1996 |
| FR | 2 772 636 | 6/1999 |
| WO | 99//32210 | * 7/1999 |

OTHER PUBLICATIONS

"La Filtration Des Huiles Moteurs" Revue Technique Diesel, ETAI, Boulogne–Billancourt, FR No. 167, 1991, pp. 9–10, 12–13.

* cited by examiner

Primary Examiner—Thomas M. Lithgow
(74) Attorney, Agent, or Firm—Sonnenschein Nath & Rosenthal

(57) ABSTRACT

The invention relates to a module of units for an internal combustion engine, comprising, as first unit, a device for separating out contaminants from the lubricating oil in the internal combustion engine, whereby the device has a filter insert, a free-jet centrifuge, driven by means of the flowing lubricating oil, at least one supply channel for lubricating oil to be purified, an outlet channel, for lubricating oil which has flowed through the filter insert and a return channel for oil which has flowed through the centrifuge, whereby the centrifuge is arranged above the filter insert in a common housing. The novel module of units is characterized in that the module comprises a further unit of the internal combustion engine, the further unit, comprising a housing which is detachably connected to the housing of the device and that both housings form the return channel between housing regions, which contact each other in a sealing manner.

10 Claims, 3 Drawing Sheets

MODULE OF UNITS FOR AN INTERNAL COMBUSTION ENGINE

BACKGROUND OF THE INVENTION

The present invention relates to an aggregate module of a combustion engine, with the module comprising as the first aggregate a unit for separating contaminants from the lubricating oil of the combustion engine, with the unit being provided with a filter element, a free-jet centrifuge drivable by lubricating oil flowing through it, at least one inlet duct for lubricating oil to be purified, one outlet duct for lubricating oil that has flown through the filter element, and one return duct for lubricating oil that has flown through the centrifuge, and with the centrifuge placed above the filter element in a common housing.

A unit for separating contaminants from the lubricating oil of a combustion engine, as described above, is known from DE 43 06 431 C1.

As is known, it is practice in the automotive industry to comprise the aggregates of a combustion engine to aggregate modules. These aggregate modules can then be prefabricated and preassembled to the largest extent possible and are then, in a final step, connected to other parts of the combustion engine, for example to the engine block. A concrete example of such an aggregate module is a combination of oil filter and fuel filter, which are forming the first and second aggregates. At their outer circumference, the housing of these two filters possess connection elements protruding to the outside, where the two housings are connected to one another, preferably by means of several screws. The central axes of the two housings are, in substance, aligned in parallel to one another, with each housing possessing a cover at its upper side, that can be removed for maintenance purposes. This known aggregate module is used on Diesel engines in trucks and busses.

In practice, increasingly strict exhaust-emission regulations cause the problem of the lubricating oil of combustion engines, in particular Diesel engines, being increasingly contaminated with fine particles, in particular soot. To remove these particles affecting lubrication adversely from the lubricating oil, the lubricating oil requires improved filtration. Theoretically, this can be achieved by using a filter element with a lower porosity, i.e., with a higher filter fineness. However, the disadvantage of such a filter element is, on the one hand that its flow resistance is higher and, on the other hand, its working life is shorter than the flow resistance and working life of the filter elements used presently. These two factors adversely affect the operation of the combustion engine and are, thus, unwanted. In practice, elimination of these factors by enlarging the filter element is excluded because of the missing free space. A second possibility of improving filtration of the lubricating oil is to combine the filter element with a centrifuge, this combination as such being known from the state-of-the-art. With a given free space, integration of the centrifuge can be achieved by reducing the height of the filter element and placing the centrifuge in the same housing above the filter element. This, however, raises the problem of an additional return duct from the centrifuge having to be created for discharging the lubricating oil that has flowed through the centrifuge. This return duct must possess a cross-section of appropriate size, so that the lubricating oil, pressureless after it has flowed through the centrifuge, can flow of quickly enough under the influence of gravity, usually into the oil pan of the combustion engine. With a given free space that cannot be increased, such a return duct can only be integrated in the unit for purifying the lubricating oil at the expense of the size of the filter element, this having the disadvantage, however, that the filter surface of the filter element is reduced to an excessive extent.

SUMMARY OF THE INVENTION

Therefore, the present invention aims at creating an aggregate module of the aforementioned type, which provides for the return duct a cross-section of appropriate size, without a given free space having to be exceeded to this end and without the filter element having to be reduced or affected otherwise in its function to achieve this.

According to the invention, this problem is solved by means of an aggregate module of the aforementioned type, which is characterized in that the module comprises a second aggregate of the combustion engine, the second aggregate is provided with a housing which is connected to the housing of the unit in a removable manner, and the two housings from between them the return duct by housing sections abutting against one another in a sealing manner.

In the aggregate module according to the invention, the free space originally available between the housings of the two aggregates forming the module is used in a favorable manner. So far, only the connection between the housings of the two aggregates has been placed in this free space in the case of the aforementioned aggregate module that is known from practice. This otherwise unused free space is now used for arranging the return duct. The effort for modifying the aggregates concerned is kept within justifiable bounds, because housing sections of the two housings connected to one another are used for forming the return duct. Accordingly, the two housing sections are formed in one piece with the respective remaining housing, in particular in the form of light-metal die casting or plastic injection-molded parts. In this manner, the return duct does not require an additional free space in the environment of the aggregate module, so that other parts of the combustion engine or the motor vehicle, which are positioned in the immediate vicinity of the aggregate module, do not have to be changed in any way. In addition, the return duct does not require any space inside the housing of the first aggregate, so that the filler element placed therein does not have to be reduced in its size because of the return duct.

A further development of the aggregate module provides that the two housings each have a substantially cylindrical basic shape with central axes running approximately in parallel or at an acute angle to one another and that the housing sections forming the return duct are each mainly formed by walls running roughly tangentially to the outer casing surfaces. In this manner, the space available between the two aggregates and/or their housings is used to an optimum extent. At the same time, the housings, when manufactured, remain demoldable without any problems.

An alternative design of the aggregate module provides that the two housings each have a substantially cylindrical basic shape with central axes running approximately in parallel or at an acute angle to one another and that the housing sections forming the return duct are, on the one hand, mainly formed by walls running roughly tangentially to the outer casing surface of the one housing and, on the other hand, by a flat covering forming a part of the other housing. This executive form also results in an excellent utilization of the space between the housings of the two aggregates, with only the separation between the two housings within the area of the housing sections abutting against one another in a sealing manner being able to take up a different position. Which one of the two variants of the aggregate module is selected is essentially based on the de-molding conditions on manufacture of the two housings as well as on the installation conditions on assembly of the two housings and the aggregate module as a whole.

The housing sections preferably abut against one another congruently, in a flat flange facing with a seal as intermediate layer. On the one hand, such a flat flange facing is easily manufactured and, on the other hand, does not cause any problems with respect to mounting and sealing of the two housing parts. Moreover, the lubricating oil is in a pressureless state in the return duct, so that it is not necessary to set high standards of the seal of the connection.

Furthermore, it is preferably provided that the flat flange facing is running in parallel or at an acute angle to the central axis of the housing of the unit and/or the housing of the second aggregate.

In order to connect the housings to one another in a mechanically rigid and, on the other hand, impermeable manner, it is appropriate to connect the two housings by means of several locking screws distributed along the sealing line between the housing sections abutting against one another in a sealing manner.

Furthermore, it is preferably provided that the lubricating oil can flow through the filter element in full flow and through the centrifuge in partial flow. In this manner, larger dirt particles are, in any case, filtered out of the lubricating oil and through the filter element at the quickest possible rate; the finer dirt particles which cannot be filtered out by the filter element are gradually removed in the partial flow by the centrifuge and accumulated in the rotor of the centrifuge.

To achieve easy and time-saving mounting of the aggregate module to the remaining combustion engine, it is finally suggested that the aggregate module to be provided with a mounting flange by means of which it can be flanged to a corresponding companion flange of the combustion engine, with flow connection being made.

BRIEF DESCRIPTION OF THE DRAWING

An executive example of the aggregate module according to the invention will be illustrated below by means of a drawing, in which.

DETAILED DESCRIPTION OF THE PREFERRED EMBODIMENT

Figure 1:
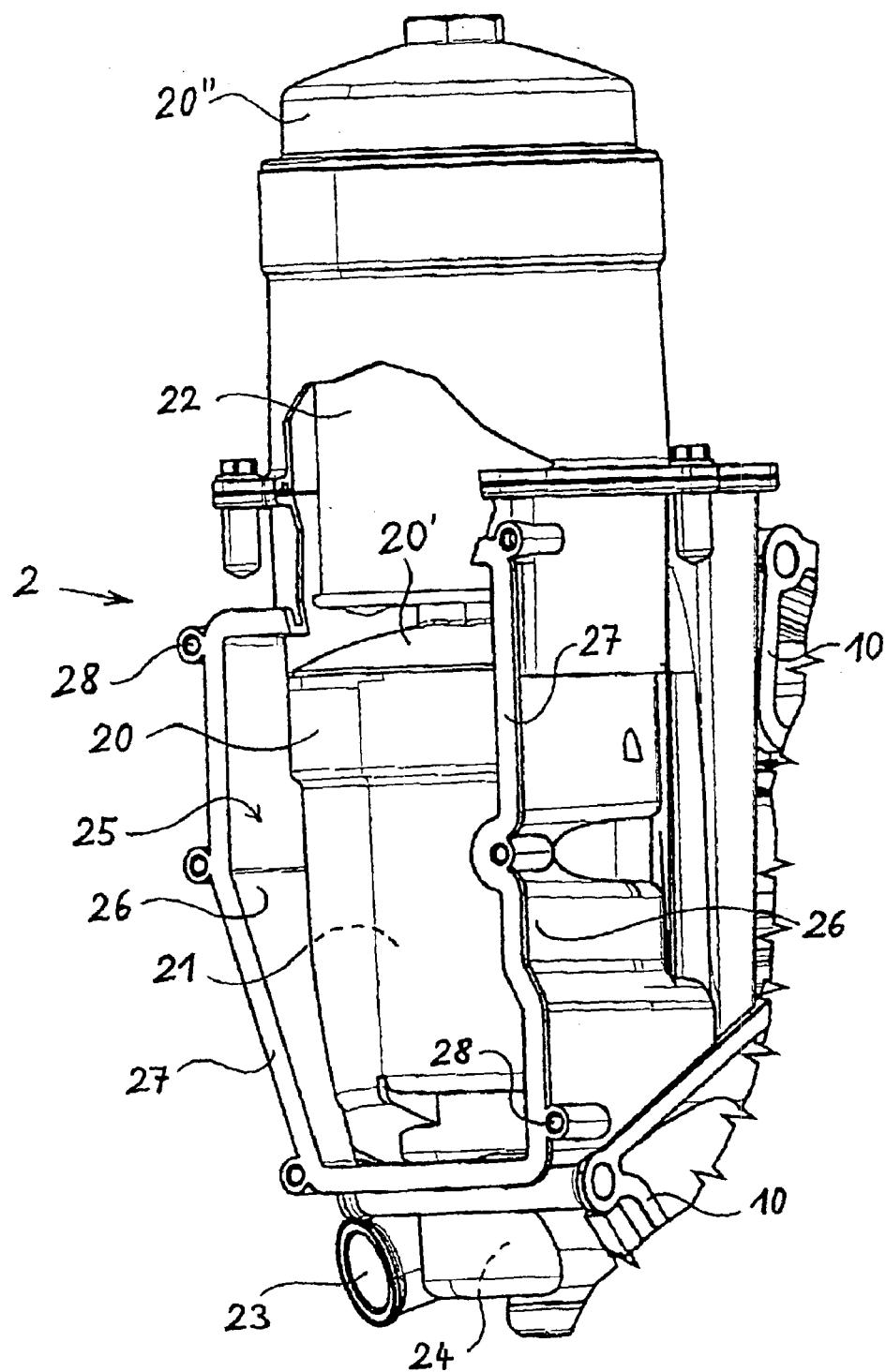
FIG. 1 illustrates in perspective a first aggregate as a part of an aggregate module.

FIG. 1 of the drawing illustrates a first aggregate 2 which, here is a unit for separating contaminants from the lubricating oil of a combustion engine. This aggregate 2 comprises a filter element 21 and a centrifuge 22. Here, the filter element is arranged concealed within a housing 20, which is closed with a first screw cover 20' immediately above the filter element 21. This first cover 20' is designed pressure-tight because, below it, the full oil pressure is applied. Further at the top inside the housing, the centrifuge 22 is arranged above the filter element 21 and the first cover 20'. Towards its top, the housing 20 is closed by a second screw cover 20" above the centrifuge 22. This second screw cover 20" may be lighter in its design, because there is no excess pressure in this part of the housing 20.

Through an inlet duct 23, the lubricating oil to be purified is first supplied to the outer circumference of the filter element 21 and then, after having flowed through the latter, through an outlet duct 24 and to the lubricating points of the associated combustion engine, which is not illustrated here. The aggregate 2 can be connected to this combustion engine by means of a mounting flange, which can be partially seen in the figure.

In a partial flow, provided by an arrangement of passages, a part of the lubricating oil that has flowed through the filter element 21 is supplied into the centrifuge 22 and flows through the latter, with the flowing lubricating oil driving the centrifuge 22 according to the reflection principle. The purified lubricating oil, which is now pressureless and is flowing out of the centrifuge 22, flows down through a return duct 25 under the influence of gravity and is finally supplied to the combustion engine, usually into the latter's oil pan.

To form a return path with a cross-section that is large enough to quickly discharge the lubricating oil downstream of the centrifuge 22, the return duct 25 is, here, provided on the outside of the housing 20. To achieve this, the housing 20 possesses single-piece housing sections 26 which are substantially protruding from the cylindrical outer circumference of the housing 20, in parallel to one another and in the form of tangential walls. These housing sections 26 end in a flat flange facing 27, in the course of which several threaded holes 28 are provided, This flange facing 27 is intended for connecting the first aggregate 2 illustrated in FIG. 1 to a second aggregate.

Figure 2:
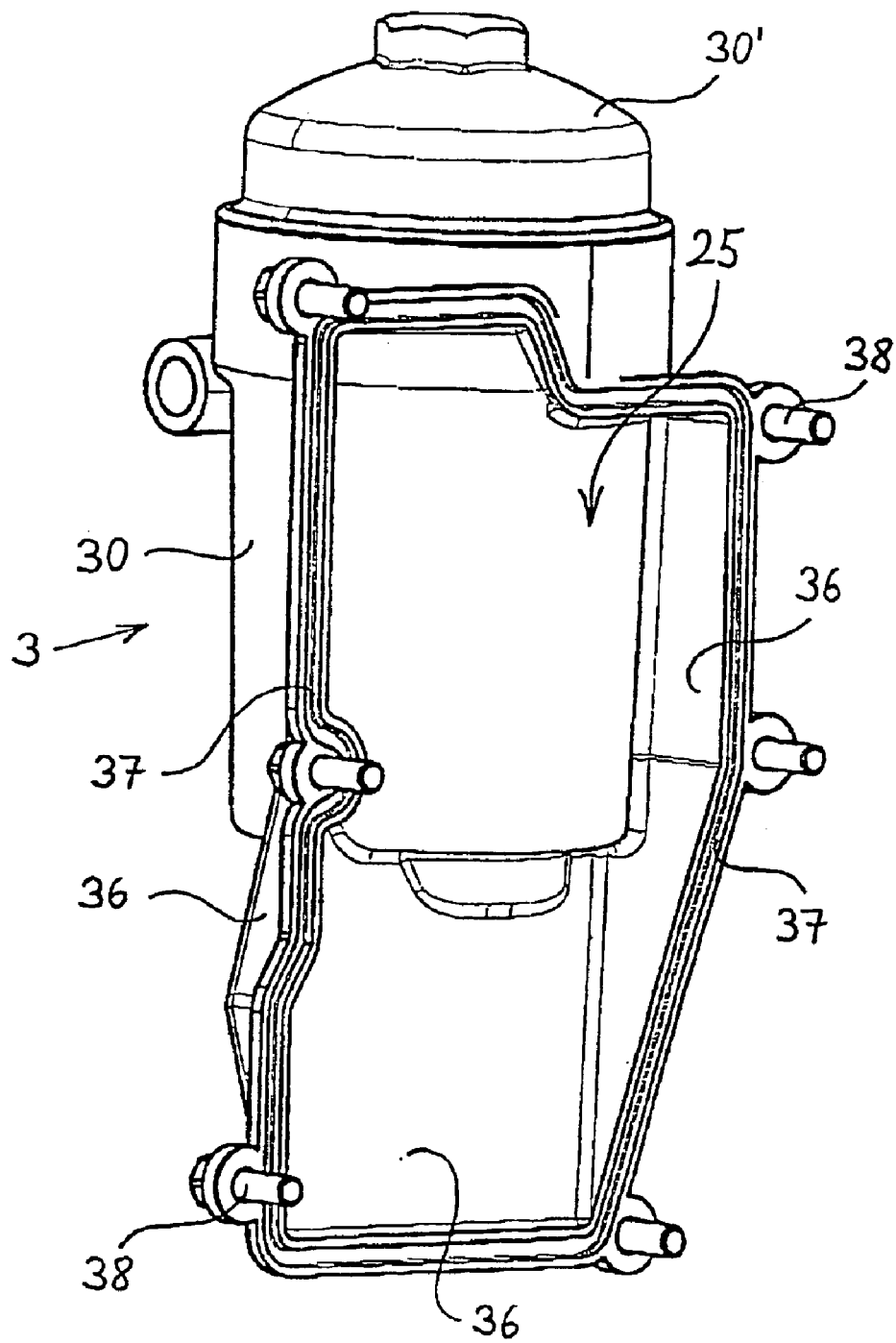
FIG. 2 illustrates also in perspective a second aggregate of the aggregate module.

A second aggregate 3 is illustrated in FIG. 2. For example, this aggregate 3 is a fuel filter. The second aggregate 3 also possesses a substantially cylindrical housing 30, which is somewhat smaller than the housing 20 of the first aggregate 2. At this top, the housing 30 is likewise closed with a screw cover 30'. Both the cover 30' and the covers 20', 20" can be screwed off, so that the filter element or the rotor of the centrifuge 22 can be replaced, if necessary.

Similarly to the housing 20 of the first aggregate 2, the housing 30 of the second aggregate 3 also possesses housing sections 36 which are designed in a single piece with the remaining housing 30. Here as well, the housing sections 36 are designed in the form of walls which are, in part, running roughly tangentially to the cylindrical housing 30 and are, in part, even extended downwards beyond the housing 30. Here as well, the housing sections 36 end in a flange facing 37, which is designed congruently with the flange facing 27 on the housing 20 of the first aggregate 2. Here, several locking screws 38 are passed through suitable openings in the course of the flange facing 37. By means of these locking screws 38, the second aggregate 3 can be connected to the first aggregate 2 in a sealing manner. The tightness required is ensured by seal provided in the area of the flange facings 27, 37.

Figure 3:
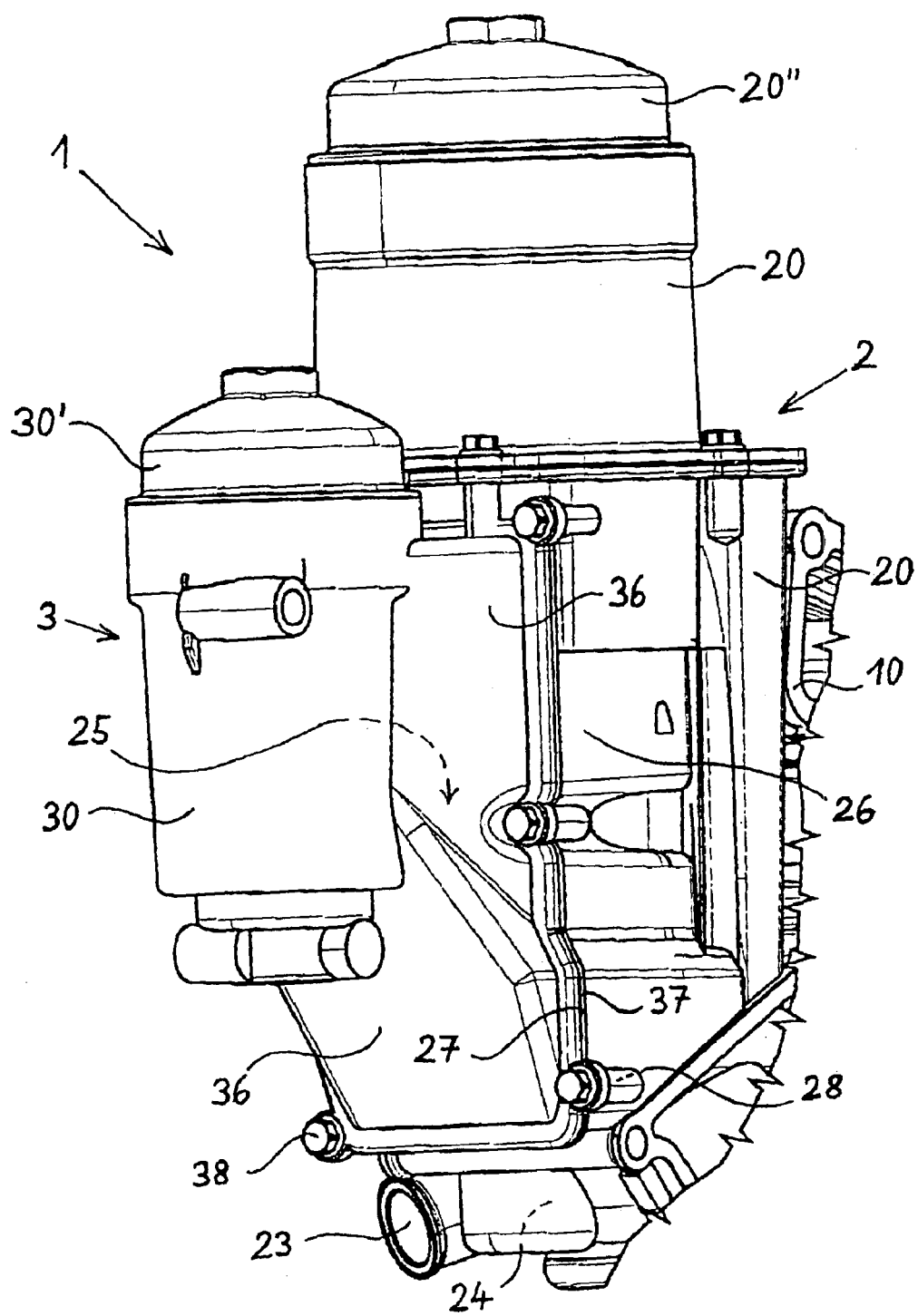
FIG. 3 illustrates also in perspective the aggregate module assembled from the two aggregates according to FIG. 1 and FIG 2.

As is illustrated in FIG. 3, the housing sections 26, 36, which are connected to one another in a sealing manner, together form, on the one hand, the mechanical connection between the first aggregate 2 and the second aggregate 3 and, on the other hand, the return duct 25 for the oil flowing out of the centrifuge 22, with the cross-section of the return duct 25, which as is large as required, being ensured here. As a result, any backflow of the lubricating oil on its path out of the centrifuge 22 into the oil pan of the associated combustion engine is prevented, so that reliable functioning of the centrifuge 22 is ensured. The space available between the two aggregates 2 and 3, which has, so far, not been used and cannot be used by other aggregates either, is used to arrange the return duct 25. This results in an especially space-saving solution.

The complete aggregate module 1 formed by the two aggregates 2, 3 is illustrated in FIG. 3. Here, the second aggregate 3 is now connected to the first aggregate 2 by means of the locking screws 38, which are screwed into the threaded holes 28, in a sealing and mechanically rigid manner. The return duct 25 for the purified lubricating oil coming from the centrifuge is positioned within the housing sections 26, 36. All of the covers 20', 20", 30' of the housings 20, 30 of the aggregates 2, 3 point upwards, so that easy accessibility is ensured for maintenance work. Here, the central axes of the two housings 20, 30 are running substantially in parallel to one another. Here as well, the flange facings 27, 37 are arranged in a plane which is substantially running in parallel to the central axes of the two housings 20, 30.

FIG. 3 illustrates in an especially excellent manner the compact construction of the aggregate module 1 with the filter element 21, the centrifuge 22, and the second aggregate 3, a fuel filter in this case. As compared with a known aggregate module, which does not comprise any centrifuge, no additional free space is required in the environment of the aggregate module 2 shown here. As a result, it is possible, within an existing combustion engine or combustion engine series, to exchange the known aggregate module by the functionally expanded new aggregate module 1, easily and without any difficulty.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The embodiments of the invention in which an exclusive property or privilege is claimed as defined as follows:

1. An aggregate module of a combustion engine, with the module comprising as the first aggregate a unit for separating contaminants from lubricating oil of the combustion engine, with the unit being provided with a filter element, a free-jet centrifuge drivable by lubricating oil flowing through it, at least one inlet duct for lubricating oil to be purified, one outlet duct for lubricating oil that has flowed through the filter element, and one return duct for lubricating oil that has flowed through the centrifuge, and with the centrifuge being placed above the filter element in a common unit housing comprising:

the module comprising a second aggregate of the combustion engine, the second aggregate being provided with a housing which is connected to the common unit housing in a removable manner, and the common unit housing and the second aggregate housing forming between them the return duct by sections of the housings abutting against one another in a sealing manner.

2. The aggregate module according to claim 1, wherein the two housings each have a substantially cylindrical basic shape of their outer casing surfaces with central axes running approximately in parallel or at an acute angle to one another and the housing sections forming the return duct are each mainly formed by walls running roughly tangentially to the outer casing surfaces.

3. The aggregate module according to claim 1, wherein the two housings each have a substantially cylindrical basic shape of their outer casing surfaces with central axes running approximately in parallel or at an acute angle to one another and wherein the housing sections forming the return duct are, on the one hand, mainly formed by walls running roughly tangentially to the outer casing surface of one of the housings and, on the other hand, by a flat cover forming a part of the other housing.

4. The aggregate module according to claim 2, wherein the housing sections abut against one another congruently, in a flat flange facing with a seal as intermediate layer.

5. The aggregate module according to claim 3, wherein the housing sections abut against one another congruently, in a flat flange facing with a seal as intermediate layer.

6. The aggregate module according to claim 4, wherein the flat flange facing runs approximately parallel to or at an acute angle to a central axis of at least one of the common unit housing and the second aggregate housing.

7. The aggregate module according to claim 5, wherein the flat flange facing runs approximately parallel to or at an acute angle to a central axis of at least one of the common unit housing and the second aggregate housing.

8. The aggregate module according to claim 1, wherein the two housings are connected by several locking screws distributed along a sealing line between the housing sections abutting against one another in a sealing manner.

9. The aggregate module according to claim 1, wherein passages are arranged in the unit such that the lubricating oil flows through the filter element in full flow and through the centrifuge in partial flow.

10. The aggregate module according to claim 1, wherein the module is provided with a mounting flange by means of which the module can be secured to a corresponding companion flange of the combustion engine, with flow connections being made.

* * * * *